(12) United States Patent
Biehl et al.

(10) Patent No.: US 9,269,284 B2
(45) Date of Patent: Feb. 23, 2016

(54) ESCAPE ROUTE MARKING WITH A LUMINOUS STRIP MADE OF PHOTOLUMINESCENT MATERIAL

(71) Applicant: Lufthansa Technik AG, Hamburg (DE)

(72) Inventors: Torben Biehl, Hamburg (DE); Hans-Christian Lierow, Hamburg (DE)

(73) Assignee: Lufthansa Technik AG, Hamburg (DE)

( * ) Notice: Subject to any disclaimer, the term of this patent is extended or adjusted under 35 U.S.C. 154(b) by 39 days.

(21) Appl. No.: 14/390,619

(22) PCT Filed: Apr. 2, 2013

(86) PCT No.: PCT/EP2013/000968
§ 371 (c)(1),
(2) Date: Oct. 3, 2014

(87) PCT Pub. No.: WO2013/149719
PCT Pub. Date: Oct. 10, 2013

(65) Prior Publication Data
US 2015/0096209 A1    Apr. 9, 2015

(30) Foreign Application Priority Data
Apr. 5, 2012   (DE) .......................... 10 2012 006 902

(51) Int. Cl.
*G09F 13/20*   (2006.01)
*B64D 25/00*   (2006.01)
*G09F 19/22*   (2006.01)
*B64D 45/00*   (2006.01)

(52) U.S. Cl.
CPC ................ *G09F 13/20* (2013.01); *B64D 25/00* (2013.01); *B64D 45/00* (2013.01); *G09F 19/22* (2013.01); *B64D 2045/007* (2013.01)

(58) Field of Classification Search
None
See application file for complete search history.

(56) References Cited

U.S. PATENT DOCUMENTS

| 4,401,050 | A | * | 8/1983 | Britt et al. ...................... 116/205 |
| 5,499,170 | A |   | 3/1996 | Gagne |
| 5,811,174 | A | * | 9/1998 | Murakami ................. 428/195.1 |
| 2008/0253139 | A1 |   | 10/2008 | Stokes |
| 2011/0049756 | A1 |   | 3/2011 | Sutter |
| 2012/0282428 | A1 |   | 11/2012 | Sutter |

FOREIGN PATENT DOCUMENTS

| DE | 296 24 636 U1 | 12/2005 |
| DE | 10 2009 040 042 A1 | 3/2011 |

(Continued)

OTHER PUBLICATIONS

International Preliminary Report on Patentability dated Oct. 7, 2014 and an English translation thereof.

*Primary Examiner* — Joanne Silbermann
(74) *Attorney, Agent, or Firm* — Young Basile Hanlon & MacFarlane P.C.

(57) ABSTRACT

An escape route marking for an airplane with a long luminous strip consisting of a photoluminescent material, a housing in which the luminous strip is arranged and that is designed clear or transparent at least on its top side, and a holding rail for the housing. The holding rail possesses a seating recess for the housing of the luminous strip and cover wings that project laterally on both sides of the holding rail in the longitudinal direction. The top side of the housing inserted in the holding recess is exposed, the cover wings are designed to be elastic, and at least the cover wings of the holding rail consist of a material that is more elastic than the material of the housing.

13 Claims, 1 Drawing Sheet

(56) References Cited

FOREIGN PATENT DOCUMENTS

| GB | 2 314 536 A | 1/1998 |
| GB | 2 448 424 A | 10/2008 |
| WO | 9633093 A1 | 10/1996 |
| WO | 2009/106342 A1 | 9/2009 |
| WO | 2011/026598 A1 | 3/2011 |

* cited by examiner

ESCAPE ROUTE MARKING WITH A LUMINOUS STRIP MADE OF PHOTOLUMINESCENT MATERIAL

FIELD OF THE DISCLOSURE

The present invention relates to an escape route marking with a long luminous strip consisting of photoluminescent material which glows in the dark. Such escape route markings are in particular used in airplanes in order to display the escape route to passengers in the dark.

BACKGROUND

A photoluminescent escape route marking is known from GB 24 48 424 A that has a long luminous strip consisting of a photoluminescent material. The luminous strip is inserted with its housing in a holding rail having a seating recess which is for the luminous strip and is open at the top. On the side, the holding rail has a mouth-shaped seat for a floor covering neighboring the escape route marking. The mouth-shaped seat is bordered at the top by cover wings projecting at the side from the holding rail, and at the bottom by latterly projecting support bars. In the seating recess of the holding rail at the transition between the base of the seating recess and its sidewall, the wall thickness of the holding rail is designed to be thinner such that the sidewall of the holding rail with the cover wing attached thereto is elastic in order to adapt the opening width of the mouth-shaped seat to the thickness of the floor covering.

SUMMARY OF THE DISCLOSURE

A disadvantage of the above known escape route marking is that adjustment to the varying thickness of floor coverings can only occur within a very limited range.

The teachings herein provide an escape route marking that can be used for floor coverings with a wide range of heights using simple means.

The escape route marking according to an embodiment of the invention possesses a long luminous strip consisting of photoluminescent material that glows in the dark. The photoluminescent material is charged by incident light and glows in the dark in order to display an escape route in the airplane. The luminous strip is arranged in a housing that is designed clear or transparent, at least at its top side, to a spectrum emitted by the photoluminescent material of the luminous strip such that the afterglow of the photoluminescent material within the housing is readily visible to the naked eye. The housing with the luminous strip is inserted into a holding rail for the housing. The holding rail possesses a seating recess for the housing of the luminous strip, and furthermore possesses cover wings on both sides of the holding rail that project laterally in the longitudinal direction.

With reference to the longitudinal direction, the cover wings project laterally from the holding rail, and their free ends define the width of the holding rail perpendicular to the longitudinal direction. The seating recess in the holding rail for the housing with the luminous strip is open at its top side such that the transparent top side of the inserted housing is exposed therein. According to this embodiment, the cover wings are designed to be elastic, wherein at least the cover wings of the holding rail consist of a material that is more elastic than the material of the housing. Using an elastic material for the cover wings makes it possible to produce a transition to a neighboring floor covering where the neighboring floor covering is arranged below the cover wings.

Whereas in the prior art, for example according to GB 24 48 424, the problem frequently arises of the holding rail breaking from a load on its cover wings, such problems cannot occur with the cover wings designed to be elastic according to the invention. In addition, given the elasticity of the cover wings, the holding rail can be easily inserted when rugs differ in thickness. It is also feasible to securely connect the neighboring floor covering, consisting for example of plastic material, to the holding rail without generating swelling or hindrances. Furthermore, the holding rail offers the advantage that it can be laid after an existing floor covering since the neighboring floor covering is only covered by the cover wings.

In one preferred embodiment, the retaining rail is formed from a material that is more elastic than the material of the housing. Since the holding rail basically consists of the seating recess and cover wings, it is unnecessary to form them from a rigid or hard material. The housing takes over the protection of the luminous strip from loads acting from the outside such as treading loads or loads from carts.

In a preferred embodiment, the cover wings are arranged on the top side of the holding rail, and the free end of the cover wings is at an angle less than 90° to the bottom side of the holding rail. The arrangement of the cover wings on the top side of the holding rail prevents interfering swelling from forming by the transition from the holding rail with the seating recess to the side wings. The slightly angled arrangement of the cover wings makes it possible for the side wings to provide sufficient pressure on the floor covering despite the elastic material of the side wings.

In a useful development, at least one of the cover wings possesses a first section running substantially parallel to the top side of the housing inserted in the seating recess; and a second section projecting at an angle from the top side. The holding rail thereby possesses a cross-sectional contour that can be easily overcome by a cart.

In order to give the housing inserted in the seating recess a better hold in the seating recess, the seating recess possesses a trapezoidal cross-section that narrows toward the surface. When an elastic material is used for the holding rail, the housing with the luminous strip can be easily inserted into the holding recess despite the narrowing width of the holding recess.

In a useful development, the bottom side of the holding rail possesses at least two bars extending in the longitudinal direction of the holding rail. The bars do not project beyond the side of the holding rail; instead, they are exclusively formed on the bottom side of the holding rail. The bars preferably terminate flush with the side wall of the holding rail at each side of the holding rail. A defined area below the holding rail is created by the bars on the side that, for example, can be used to adhere the holding rail to a base, or for compensating height.

In an expedient development of the escape route marking, a filler material is provided that is arranged on the bottom side of holding rail and consists of a foam material. The height of the holding rail can be adjusted by the foam filler material. Furthermore, the use of a foam material allows a savings in weight of approximately 30% in comparison to a height adjustment consisting of polycarbonate.

The thickness of the filler material is preferably dimensioned such that the free ends of the cover wings possess a height at which the cover wings lie on a neighboring floor covering when the cover wings experience elastic deformation. By adapting the thickness of the filler material, a secure overlay of the cover wings on a neighboring floor covering can be achieved. When a floor covering has a greater thickness, a thicker filler material is preferably used than with a floor covering with a lesser thickness, and the filler material is provided for adhesive connection with the base. The height of the escape route marking can be adapted to different heights of the floor covering by means of filler material of different thickness.

The holding rail is preferably made of a plastic material with a hardness of Shore A20 to A90. The holding rail thereby forms an elastic insert for the housing of the luminous strip. The holding rail is preferably manufactured as a single piece by means of extrusion.

BRIEF DESCRIPTION OF THE DRAWINGS

A preferred embodiment of the escape route marking according to the invention is further explained with reference to an example. In the figures.

DETAILED DESCRIPTION

Figure 1:
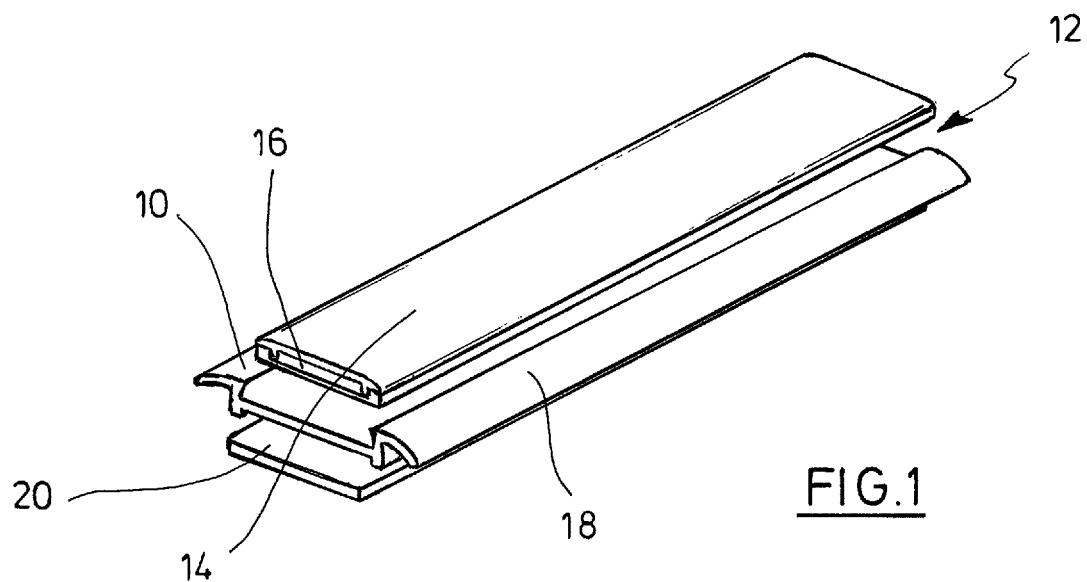
FIG. 1 shows a cross-sectional view of the escape route marking according to the invention in an exploded view.

FIG. 1 shows a holding rail 10 that has a seating recess 12. Inserted in the seating recess 12 is a housing 14 in which a photoluminescent luminous strip 16 is arranged. The holding rail 10 possesses laterally projecting cover wings 18 and is provided with filling material 20 on its bottom side. FIG. 1 shows a section of the escape route marking that, for example, can be used within the interior of an airplane.

Figure 2:
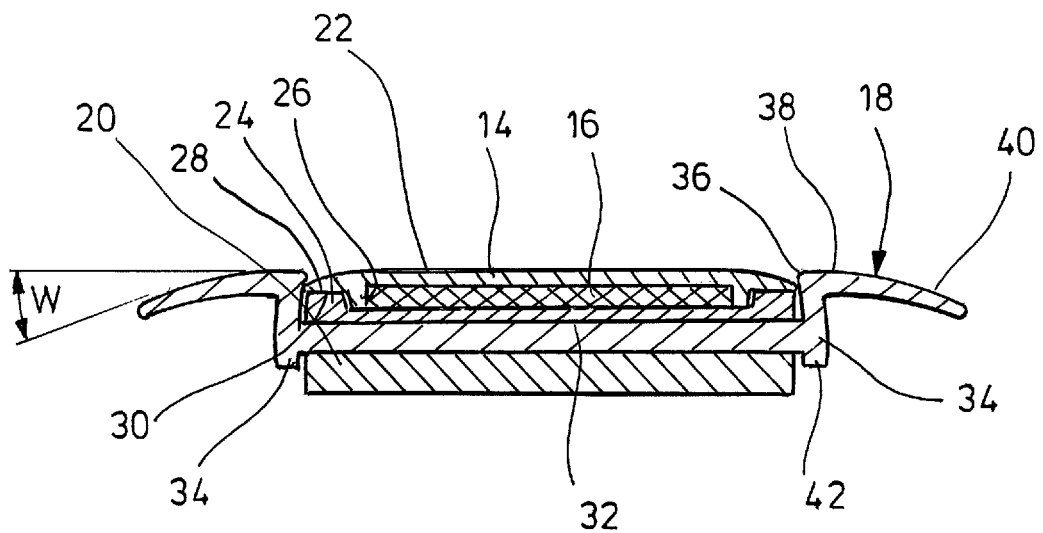
FIG. 2 shows a cross-section of the escape route marking.

As can be seen in FIG. 2, the housing 14 is constructed in two parts and possesses a top shell 22 made of a transparent material and a bottom shell 24. On its side facing the bottom shell 24, the upper shell 22 possesses projecting bars 26 that border a seating area for the luminous strip. Outside of the bars 26, the upper shell possesses a contact edge 28 that lies on a corresponding contact edge 30 of the bottom shell. The upper and bottom shells are made of a plastic material (polycarbonate). The housing 14 completely surrounds the photoluminescent luminous strip, which for example consists of a plastic material enriched with photoluminescent pigments to protect the luminous strip from environmental influences such as moisture and liquids.

The housing 14 can be glued in the seating recess 12 with the holding rail 10; however, full-surface adhesion of the housing within the holding rail is not absolutely necessary.

As can be seen in FIG. 2, the holding rail possesses a base 32 to which the sidewalls 34 are connected. The base 32 and side walls 34 border the seating recess 12 for the housing. The side walls 34 are angled slightly inward at the top on the side of the base 32 facing the housing 14 to form a projection 36 holding the upper shell 22 of the housing. This gives the seating recess 12 a trapezoidal cross-section. A cover wing 18 projects laterally at the top side of each side wall 34. The cover wing 18 projects beyond the side wall 34 and thereby defines the width of the holding rail 10. The cover wing 18 possesses a first area 38 that runs substantially parallel to the top side of the upper shell 22, and a second area 40 that is angled relative to the first area by an angle W.

On its bottom side, the holding rail 10 possesses side bars 42 that form the continuation of the side wall. The filler material 20 is arranged between the bars 42. The filler material 20, as a foamed material, possesses less weight. Given its foamed composition, material densities of the filler material between 30 kg/m$^3$ and 70 kg/m$^3$ can be achieved by using elastomer or thermoplastic elastomer. The filler material possesses a very low compression set of less than 20%. Compression set is a known measure of how elastomers behave under long-lasting, constant pressure deformation and subsequent release. The filler material 20 is also preferably elastically deformable for which the use of soft elastic foam or plastic such as polyethylene is suitable. For processing within airplanes, the material preferably possesses a water absorption capacity of less than 3% and is also designed flame-resistant.

The holding rail 10 can consist of an elastomer or a thermoplastic elastomer, and forms a soft insert for the housing of the luminous strip. The holding rail is extracted as a single part with its cover wings. The material possesses a Shore hardness of A20 to A90, preferably within the range of Shore A60 to Shore A90. The holding rail 10 can possess a color adapted to the neighboring floor covering. It is also possible to manufacture the holding rail transparent, translucent or opaque. The housing for the luminous strip 16 consists of a hard plastic with a type A Shore hardness of over 90, and preferably over A100. Polycarbonate with a corresponding Shore A hardness is particularly suitable as a material for the housing.

When using the escape route marking according to the invention, a distinction is drawn in particular between use within the kitchen area with a non-textile flooring (NTF) and a carpet in the aisle. Both floor coverings possess a different height, and the NTF floor covering used in the kitchen area normally possesses a height of 2.5 mm. The holding rail 10 with its cover wings 18 is designed for the NTF floor covering. If it is used in the aisle with carpet, a filler material 20 is used which lifts the holding rail 10 to a corresponding extent such that the cover wings lie on the carpet with sufficient pressure, wherein the cover wings are elastically deformed.

The invention claimed is:

1. An escape route marking for an airplane comprising:
    a long luminous strip consisting of a photoluminescent material;
    a housing in which the luminous strip is arranged and that is designed clear or transparent at least on its top side;
    a holding rail for the housing that possesses a seating recess for the housing of the luminous strip and cover wings that project laterally on both sides of the holding rail in the longitudinal direction, wherein the top side of the housing inserted in the holding recess is exposed, the cover wings are designed to be elastic, and at least the cover wings of the holding rail consist of a material that is more elastic than a material of the housing; and
    a flame resistant filler material arranged on a bottom side of the holding rail and consisting of a foam material, said filler material being a foamed composition having a material density between 30 kg/m$^3$ and 70 kg/m$^3$.

2. The escape route marking according to claim 1, wherein an entirety of the holding rail consists of the material that is more elastic than the material of the housing.

3. The escape route marking according to claim 1, wherein the cover wings are arranged on the top side of the holding rail, and free ends of the cover wings are angled at an angle relative to the bottom side of the holding rail.

4. The escape route marking according to claim 1, wherein at least one of the cover wings possesses a first section running substantially parallel to the top side of the housing inserted in the seating recess and a second section projecting at an angle from the top side of the housing.

5. The escape route marking according to claim 1, wherein the seating recess possesses a trapezoidal cross-section that narrows towards its top side.

6. The escape route marking according to claim 1, wherein the bottom side of the holding rail possesses at least two projecting bars extending in the longitudinal direction.

7. The escape route marking according to claim 6, wherein the at least two projecting bars terminate flush with a side wall of the holding rail on each side of the holding rail.

8. The escape route marking according to claim 7, wherein a filler material is arranged within the at least two projecting bars on the bottom side of the holding rail.

9. The escape route marking according to claim 7, wherein a thickness of the filler material is dimensioned such that free ends of the cover wings possess a height at which the cover wings lie on a neighboring floor covering when the cover wings experience elastic deformation upon installation within said floor covering.

10. A floor covering for an airplane including the escape route marking according to claim 7, wherein a thickness of the filler material is dimensioned such that free ends of the cover wings possess a height at which the cover wings lie on the floor covering within the airplane when the cover wings experience elastic deformation.

11. The escape route marking according to claim 1, wherein a height of the escape route marking is adapted to different floor covering heights by filler material of different thicknesses.

12. The escape route marking according to claim 1, wherein the holding rail consists of a plastic material with a hardness of Shore A20 to A90.

13. The escape route marking according to claim 1, wherein the bottom side of the holding rail possesses at least two projecting bars extending in the longitudinal direction and extending perpendicular to the bottom side of the holding rail; and wherein the filler material extends below a bottom of the at least two projecting bars on the bottom side of the holding rail.

\* \* \* \* \*